United States Patent
Sheff

(10) Patent No.: US 10,392,073 B2
(45) Date of Patent: Aug. 27, 2019

(54) COEFFICIENT ERGONOMIC BICYCLE HANDLEBAR SYSTEMS

(71) Applicant: Don Sheff, Redwood City, CA (US)

(72) Inventor: Don Sheff, Redwood City, CA (US)

(*) Notice: Subject to any disclaimer, the term of this patent is extended or adjusted under 35 U.S.C. 154(b) by 0 days.

(21) Appl. No.: 16/024,508

(22) Filed: Jun. 29, 2018

(65) Prior Publication Data
US 2018/0304956 A1    Oct. 25, 2018

Related U.S. Application Data

(63) Continuation-in-part of application No. 15/097,374, filed on Apr. 13, 2016, now abandoned.

(51) Int. Cl.
*B62K 21/12* (2006.01)

(52) U.S. Cl.
CPC .................................. *B62K 21/12* (2013.01)

(58) Field of Classification Search
CPC ............................ B62K 21/12; Y10T 74/2078
See application file for complete search history.

(56) References Cited

U.S. PATENT DOCUMENTS

| | | | | |
|---|---|---|---|---|
| 4,503,729 A | * | 3/1985 | Shinnano | B62K 21/12 74/551.1 |
| 4,829,847 A | * | 5/1989 | Modolo | B62K 21/12 74/551.1 |
| 5,024,119 A | | 6/1991 | Linden | |
| 5,083,476 A | * | 1/1992 | Borromeo | B62K 21/12 74/551.1 |
| 5,390,564 A | * | 2/1995 | Klieber | B62K 21/12 74/551.1 |
| 5,660,085 A | | 8/1997 | Tamplin | |
| 2004/0244526 A1 | | 12/2004 | Jones | |

FOREIGN PATENT DOCUMENTS

DE          9116448 U1 * 10/1992 ............. B62K 21/12

* cited by examiner

*Primary Examiner* — Thomas C Diaz
(74) *Attorney, Agent, or Firm* — Integrity Patent Group, PLC; Charles E. Runyan

(57) ABSTRACT

A bicycle handlebar system that ensures comfort, safety, increasing center of gravity control. An ergonomic bicycle handlebar system including a hood having: a hood sweep angle from a top bar hood to a first portion of a drop, a drop angle from the first portion of a drop to the second portion of a drop, a thumb index; and a palm flat segment. The coefficient ergonomic bicycle handlebar may be made of nano tube zlyte resin with graphene impregnated carbon fibers.

18 Claims, 5 Drawing Sheets

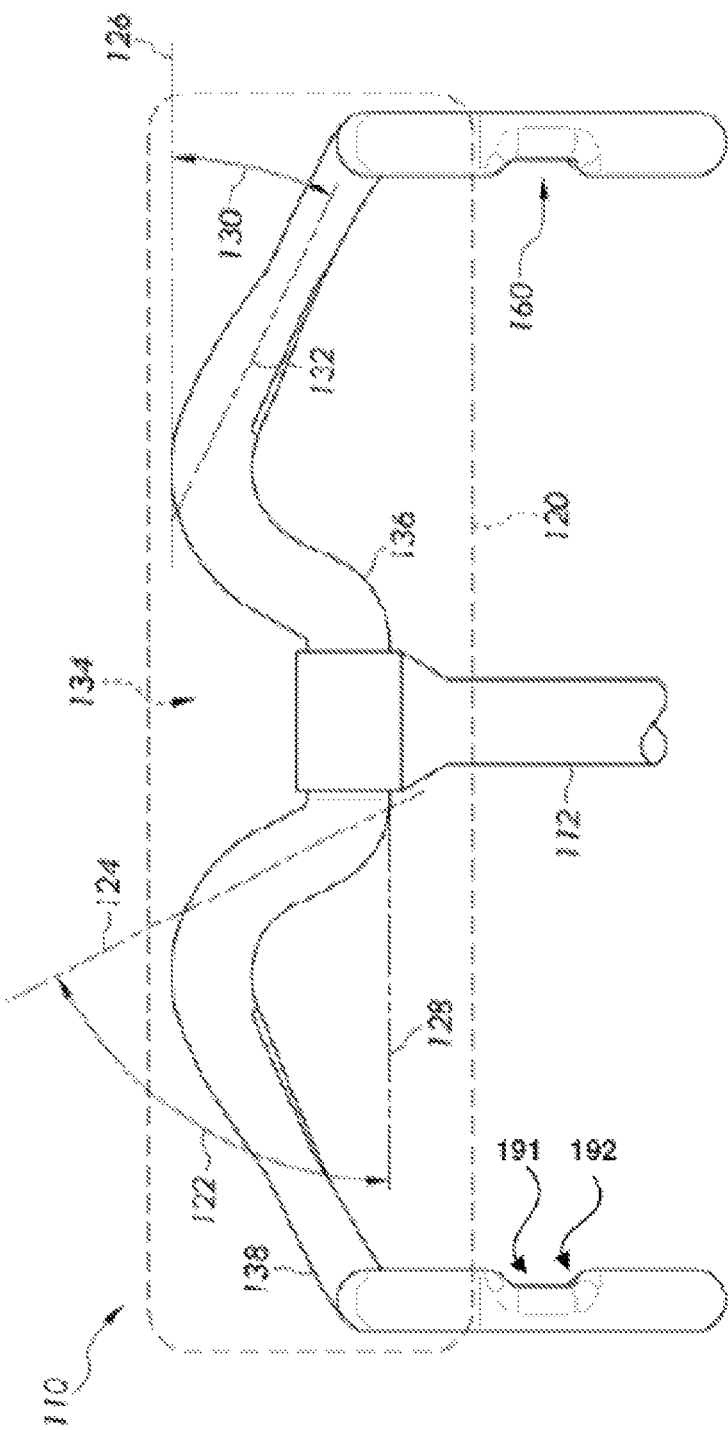

COEFFICIENT ERGONOMIC BICYCLE HANDLEBAR SYSTEMS

CROSS-REFERENCE TO RELATED APPLICATION(S)

The present application is a Continuation-in-Part and is related to and claims priority to pending U.S. Non-Provisional patent application Ser. No. 15/973,374 filed Apr. 13, 2016, which is incorporated by reference herein in its entirety.

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of bicycle handlebars and more specifically relates to coefficient bar ergonomic bicycle handlebar systems.

2. Description of Related Art

Cyclists, especially competitive cyclists, look for every advantage they can gain with their equipment. Improper cyclist mechanics decrease efficiency, which can cause strain and fatigue. For example, if the cyclist is wrongly positioned due to improperly designed handlebars, it can increase wind resistance and cause fatigue to the cyclist. The same goes for the cyclist's breathing. If the arms and shoulders are in improper alignment, it can constrict the lungs and prevent them from functioning at full capacity, which will put the racer at a competitive disadvantage. Arm and shoulder position is crucial to limit and avoid injury in case of a crash. Improper arm and elbow position increases the likelihood of injury in the event of a crash. A suitable solution is desirable.

Bicyclists seek to maximize efficiency while minimizing the risk of injury. Equipment optimization is a vital aspect of this desire. The correct aspects of ergonomic bicycle handlebar systems require proper positioning of the hands which in turn dictates the position of the elbows as well as the shoulders. Proper elbow and shoulder positioning reduces the frontal area while locating the rider properly to reduce the chance of a broken collarbone and/or rotator cuff. Further benefits of proper hand and elbow placement is the reduction in lost energy due to "side-to-side" motion while pedaling. What is needed is a bicycle handlebar system that ensures comfort, safety, and control.

Several attempts have been made to solve the above-mentioned problems such as those found in U.S. Pub. No. 2004/0244526 to Jones, U.S. Pat. No. 4,829,847 to Modolo, U.S. Pat. No. 5,083,476 to Borromeo, U.S. Pat. No. 5,390,564 to Klicher, U.S. Pat. No. 5,024,119 to Linden, and U.S. Pat. No. 5,660,085 to Tamplin. This art is representative of bicycle handlebars. However, none of the above inventions and patents, taken either singly or in combination, is seen to describe the invention as claimed.

Preferably, a bicycle handlebar system should provide a user with comfort, safety, and control and, yet would operate reliably and be manufactured at a modest expense. Thus, a need exists for a reliable ergonomic bicycle handlebar system to avoid the above-mentioned problems.

BRIEF SUMMARY OF THE INVENTION

In view of the foregoing disadvantages inherent in the known bicycle handlebar art, the present invention provides a novel coefficient bar ergonomic bicycle handlebar system. The general purpose of the present invention, which will be described subsequently in greater detail is to provide a device useful for a bicycle handlebar system that effectively ensures comfort, safety, and control.

An ergonomic bicycle handlebar system is disclosed herein, in a preferred embodiment, comprising: a hood comprising: a hood sweep angle from a top bar hood to a first portion of a drop, a drop angle from the first portion of a drop to the second portion of a drop, two thumb indices; and two palm flat segments. Preferably the coefficient bar ergonomic bicycle handlebar is made of nano tube zlyte resin with graphene impregnated carbon fibers or similar structurally sound materials. Additionally, vibration reducing materials will be applied in the future adding comfort.

The two palm flat segments each comprise a straight length of the handlebar segment that is structured and arranged adjacent to a lowest handlebar segment. Each of the straight length of the handlebar segment is structured and arranged for a rider to grasp each the straight length of the handlebar segment. The two thumb indices each comprise a longer thumb index dimension and a shorter thumb index dimension, which together define a thumb index flat surface, and which define each of the exactly two thumb indices. The longer thumb index dimension that is structured and arranged parallel to a vertical handlebar segment when mounted on the bicycle stem. The shorter thumb index dimension length that is structured and arranged perpendicular to the vertical handlebar segment. Each of the thumb index flat surface is angled at a mirrored angle relative to the bicycle stem. In a preferred embodiment, the mirrored angle of each the thumb index flat surface comprises approximately ninety degrees.

The coefficient ergonomic bicycle handlebar of the preferred embodiment comprises a hood sweep angle and the drop angle work in functional combination wherein the hood sweep angle is 12.50 degrees; wherein drop angle is 26.5 degrees; wherein thumb index and said palm flat segment work together in functional combination; wherein a preferred palm flat segment is 65 mm; and wherein the palm flat segment results in a wrist position of 10 degrees of rotation with respect to the forearm when coordinated with thumb index. In some embodiments, a longer thumb index dimension of exactly two palm flat segments is greater than 100 mm. In some embodiments, a shorter thumb index dimension of exactly two palm flat segments is greater than 20 mm. And in some embodiments, the thumb index flat surface has an area less than 5 square cm.

The preferred embodiment of the coefficient ergonomic bicycle handlebar system further comprises a kit including: the coefficient ergonomic bicycle handlebar and a set of unique installation instructions.

Also disclosed herein is a method of using a coefficient bar ergonomic bicycle handlebar system the steps of which preferably comprise: obtaining a coefficient ergonomic bicycle handlebar, mounting a coefficient ergonomic bicycle handlebar, and gripping a coefficient bar ergonomic bicycle handlebar and adjusting as desired.

The present invention holds significant improvements and serves as an ergonomic handlebar bicycle handlebar system.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, coefficient ergonomic bicycle handlebar system, constructed and operative according to the teachings of the present invention.

FIG. 2 is a perspective view illustrating the coefficient ergonomic bicycle handlebar comprising the coefficient ergonomic bicycle handlebar according to an embodiment of the present invention of FIG. 1.

The various embodiments of the present invention will hereinafter be described in conjunction with the appended drawings, wherein like designations denote like elements.

DETAILED DESCRIPTION

As discussed above, embodiments of the present invention relate to bicycle handlebar systems and more particularly to the coefficient ergonomic bicycle handlebar system as used to improve the rider's body and hand position for improving efficiency and safety. Generally speaking, an ergonomic bicycle handlebar system may comprise a coefficient ergonomic bicycle handlebar as disclosed herein.

Figure 1:
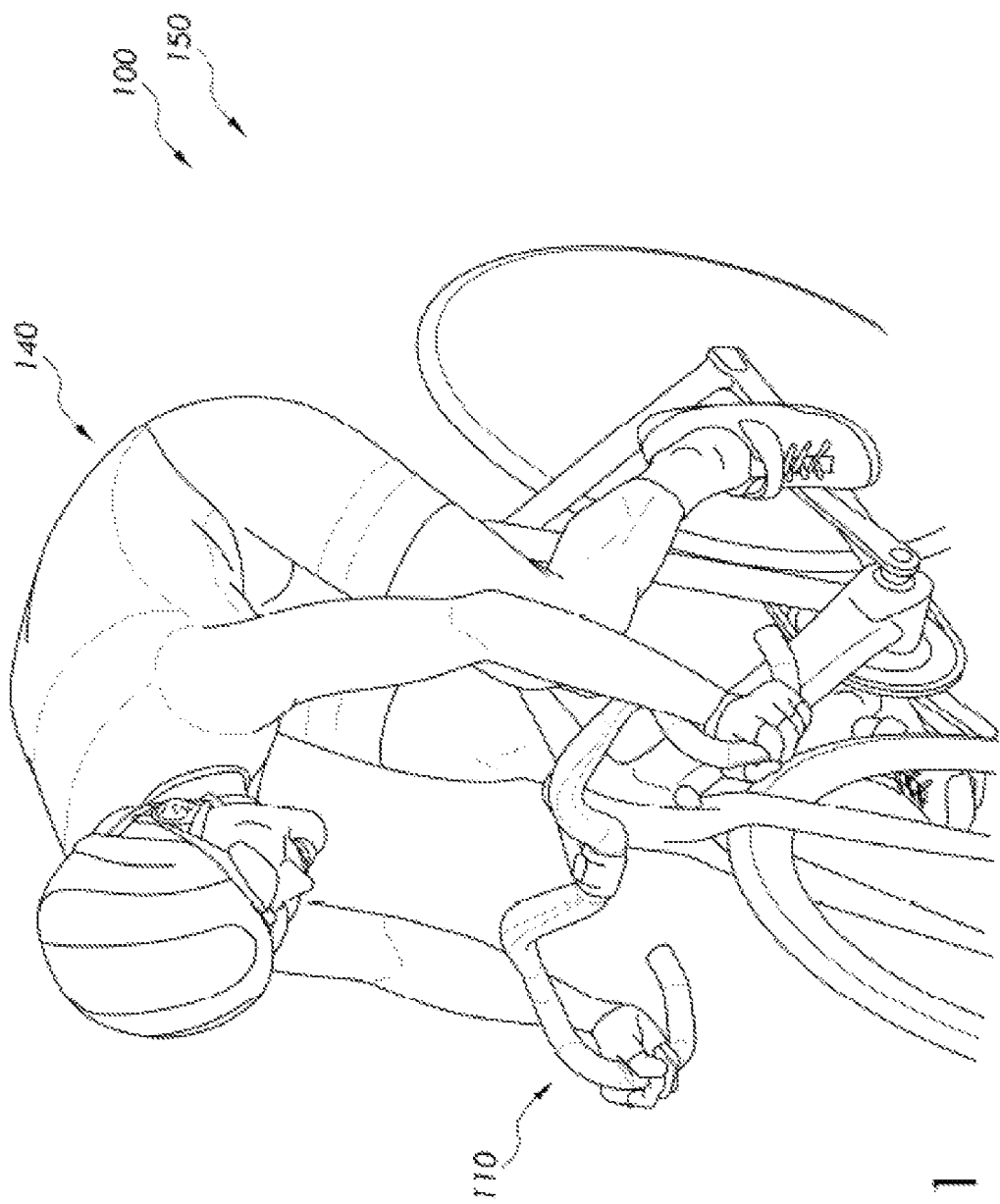
FIG. 1 shows a perspective view illustrating a coefficient ergonomic bicycle handlebar system during an 'in-use' condition showing a coefficient ergonomic bicycle handlebar according to an embodiment of the present invention.

Referring to the drawings by numerals of reference there is shown in FIGS. 1-4, coefficient ergonomic bicycle handlebar system 100 which comprises coefficient bar ergonomic bicycle handlebar 110. FIG. 1 shows a perspective view illustrating coefficient ergonomic bicycle handlebar system 100 during an 'in-use' condition showing coefficient ergonomic bicycle handlebar 110 according to an embodiment of the present invention.

Referring now to FIG. 2, coefficient ergonomic bicycle handlebar 110 comprises: hood 120 comprising: top bar hood zone 134 as mounted in stem 112, to a first portion of drop zone 136, a second portion of drop zone 138, thumb index 160, and palm flat segment 170 in functional combination and designed for ergonomics when controlling a bike equipped with coefficient ergonomic bicycle handlebar 110. Coefficient ergonomic bicycle handlebar 110 may be structured and arranged to provide user 140 with a device for maximizing bicycle riding efficiency and safety.

Coefficient ergonomic bicycle handlebar 110 is arranged in a manner wherein hood sweep angle 122 and drop angle 130 work in functional combination to create desired ergonomics and concurrently centering of gravity. Hood zone 120 is arranged such that drop angle 130 forms an angle of 26.5 degrees from drop line 132 with respect to first horizontal line 126. Hood zone 120 is arranged such that hood sweep angle 122 forms an angle of 12.50 degrees from hood sweep line 124 with respect to first horizontal line 128.

Figure 3A:
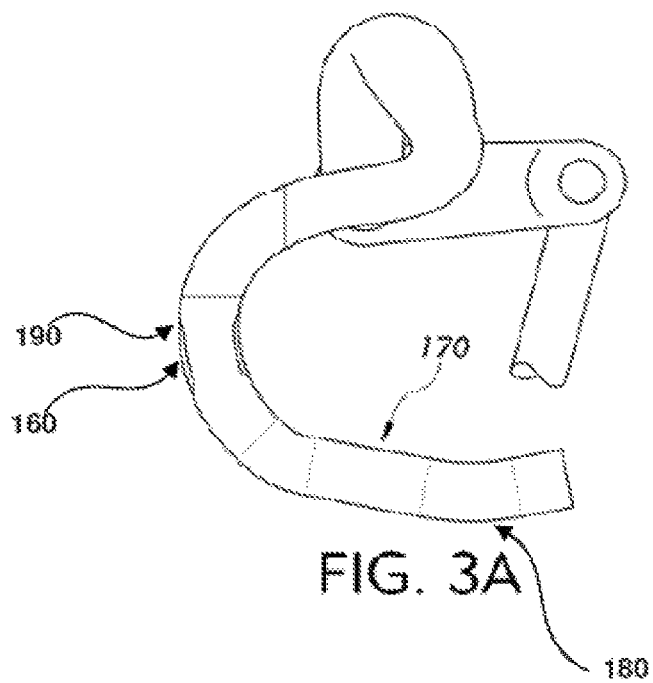
FIG. 3A is a perspective view illustrating the coefficient ergonomic bicycle handlebar according to an embodiment of the present invention of FIGS. 1-2.
Figure 3B:
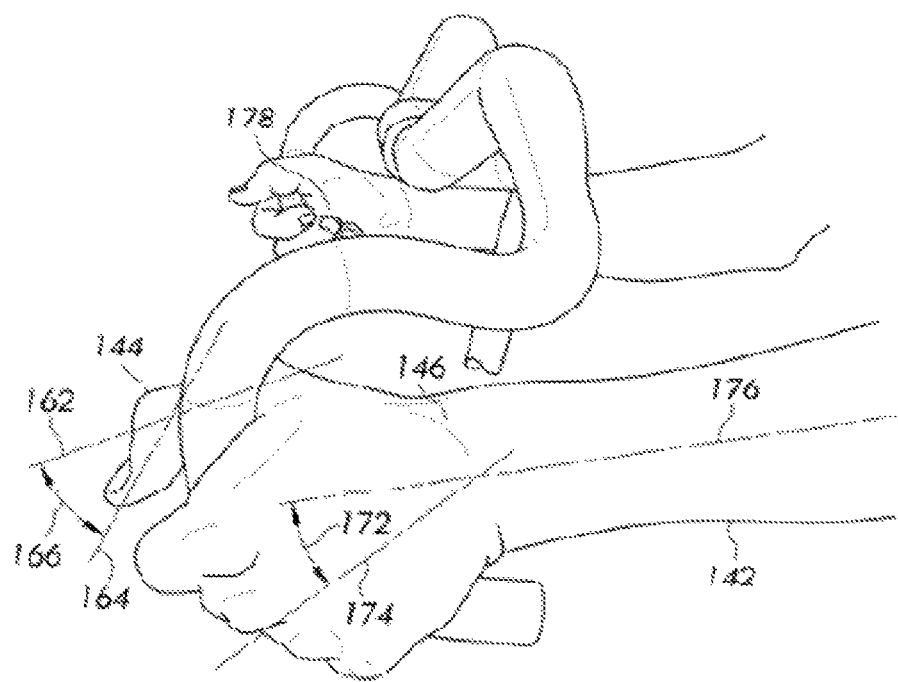
FIG. 3B is another perspective view illustrating the coefficient ergonomic bicycle handlebar according to an embodiment of the present invention of FIGS. 1-2.

FIG. 3A shows coefficient ergonomic bicycle handlebar system 100 wherein the palm flat steering segment 170 is 65 mm. Referring now to FIG. 3B, which shows coefficient ergonomic bicycle handlebar system 100 is arranged in a manner wherein palm flat steering segment 170 results in a wrist 146 position in relation to forearm 142 such that palm angle 172 creates a palm 178 rotation of 10 degrees toward the center of bike gravity between forearm angle line 176 and wrist angle line 174. Lowest handlebar segment 180 is located adjacent to palm flat steering segment 170 and is the lowest handlebar segment relative to top bar hood 134. Vertical handlebar segment 190 is located between palm flat segment 170 and second portion of drop 138. Thumb index 160 is positioned on vertical handlebar segment 190. Thumb index 160 comprises a longer thumb index dimension 191 and a shorter thumb index dimension 192.

Figure 4:
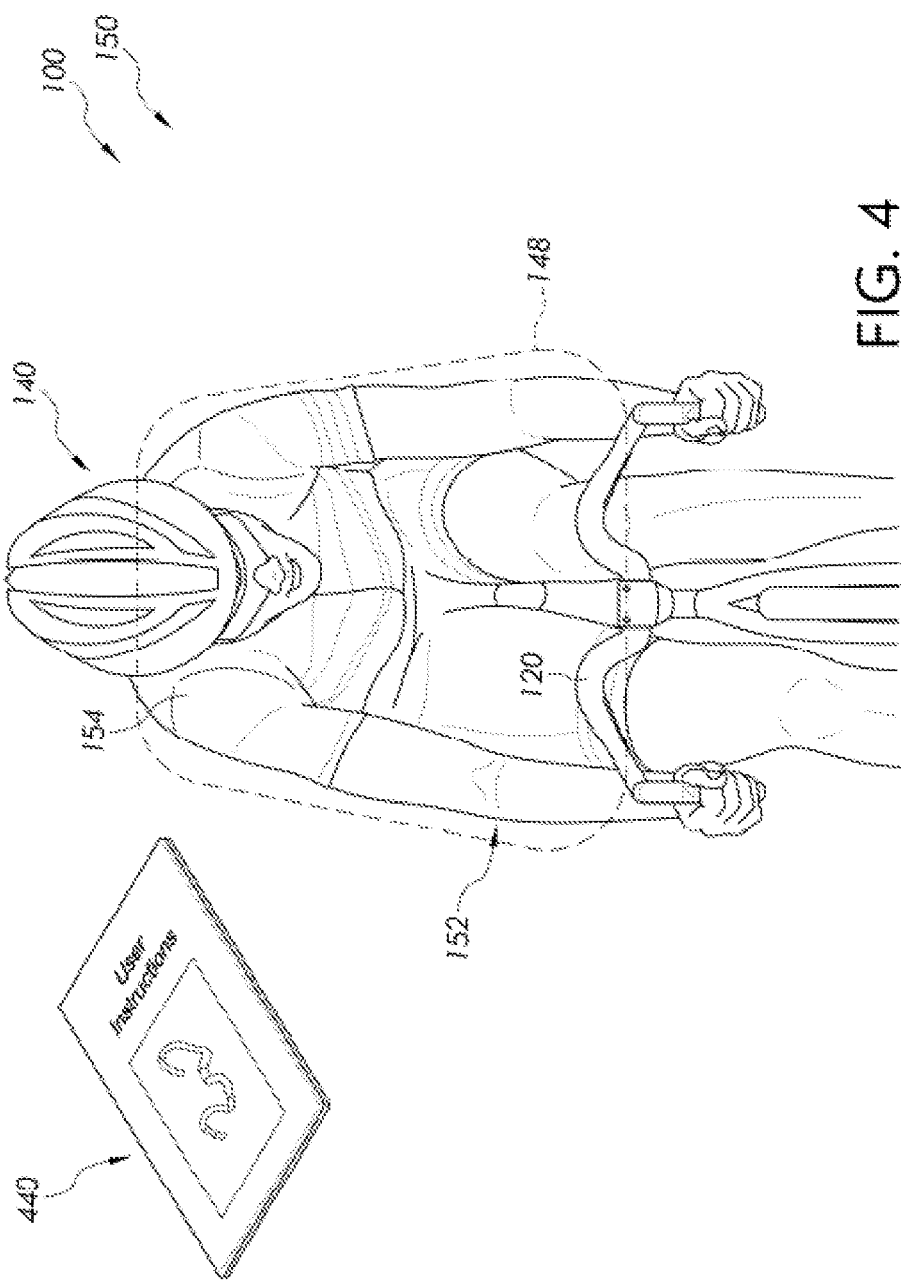
FIG. 4 is a perspective view illustrating the coefficient ergonomic bicycle handlebar according to an embodiment of the present invention of FIGS. 1, 2, 3A, and 3B.

Referring now to FIG. 4, which shows coefficient ergonomic bicycle handlebar 110 wherein thumb index 160 (two thumb indices) and palm flat steering segment 170 work together in functional combination to achieve desired center of gravity orientation of coefficient ergonomic bicycle handlebar 110. Thumb index 160 of coefficient ergonomic bicycle handlebar 110 provides a thumb 144 reference for proper gripping of coefficient ergonomic bicycle handlebar 110 resulting in moving elbows 152 inward 3-5 degrees for optimal minimal frontal area 148 and safety. FIG. 4 further illustrates coefficient ergonomic bicycle handlebar 110 in relation to the user's 140 body positioning wherein the functional combination of thumb index 160 and palm flat segment 170 position elbows of a rider for optimal arrangement to reduce injury through proper elbow 152 alignment should a crash result while gripping coefficient ergonomic bicycle handlebar 110. Thumb index 160 is arranged at thumb index angle 166 of thumb index line (1) 162 and thumb index line (2) 164 results in a 3 degree to 5 degree inward rotation of elbows 152.

Certain embodiments of coefficient ergonomic bicycle handlebar system 100 may be arranged such that the functional combination of hood sweep angle 122 and drop angle 130 provide an optimal position of a rider's grip for optimal reduction of frontal area 148 thus reducing wind resistance through proper shoulder 154 and cyclists profile alignment.

Certain embodiments of the coefficient ergonomic bicycle handlebar system 100 may be arranged such that the functional combination of hood sweep angle 122 and drop angle 130 provide an optimal position of a rider's grip for improved riding efficiency while pedaling by limiting the amount of energy lost in side to side movement outside of a more nominal center of gravity. Also, embodiments of coefficient ergonomic bicycle handlebar system 100 may be arranged such that drop angle 130 from top bar hood 134 to the first portion of drop 136 provides enhanced rider efficiency by positioning the shoulders for presenting a minimal frontal area 148. Certain embodiments of the coefficient ergonomic bicycle handlebar 110 may be made of nano tube zlyte resin with Graphene impregnated carbon fibers. Other materials may be used in alternate embodiments.

Certain embodiments of the coefficient ergonomic bicycle handlebar system 100 may be arranged such that the functional combination of hood sweep angle 122 and drop angle 130 create an optimal camera angle for viewing traffic behind user 140. These embodiments of coefficient ergonomic bicycle handlebar system 100 may be arranged such that the functional combination of hood sweep angle 122 and drop angle 130 create an optimal camera angle for viewing road beneath and behind user 140.

Coefficient ergonomic bicycle handlebar system 100 may be sold as kit 440 comprising the following parts: at least one coefficient ergonomic bicycle handlebar and at least one set of user instructions. The kit has instructions such that functional relationships are detailed in relation to the structure of the invention (such that the invention can be used, maintained, or the like in a preferred manner). Coefficient ergonomic bicycle handlebar system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different orientations and combinations, parts may be sold separately, etc., may be sufficient.

Figure 5:
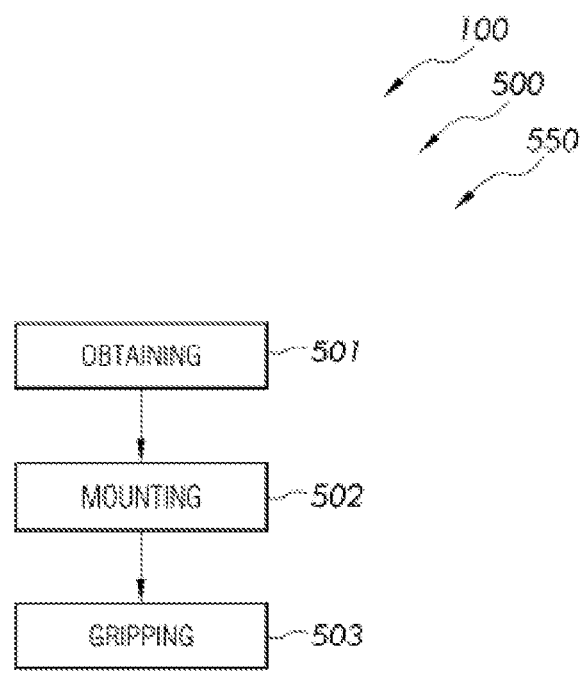
FIG. 5 is a flowchart illustrating a method of use for the coefficient ergonomic bicycle handlebar system according to an embodiment of the present invention of FIGS. 1-4.

Referring now to FIG. 5, showing flow chart 550 illustrating method of use 500 for an coefficient ergonomic bicycle handlebar system. 100 according to an embodiment of the present invention of FIGS. 1-4.

As shown, method of use 500 may comprise the steps of: step one 501, obtaining coefficient ergonomic bicycle handlebar system 100; step two 502 mounting coefficient ergonomic bicycle handlebar 110; and step three 503 gripping coefficient ergonomic bicycle handlebar 110 for in-use condition 150.

It should be noted that the steps described in the method of use can be carried out in many different orders according to user preference. The use of "step of" should not be interpreted as "step for", in the claims herein and is not intended to invoke the provisions of 35 U.S.C. § 112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A coefficient ergonomic bicycle handlebar system comprising:
    a) a hood comprising:
        i) a top bar hood comprising:
            (1) exactly two mirror-imaged top bars;
            (2) wherein each of said exactly two mirror-imaged top bars is structured and arranged for structurally mounting to a bicycle stem;
            (3) wherein said exactly two mirror-imaged top bars comprise a single top bar structural member;
        ii) exactly two drops comprising:
            (1) a first portion of each of said exactly two drops; and
            (2) a second portion of each of said exactly two drops;
            (3) wherein said first portion of each of said exactly two drops and said second portion of each of said exactly two drops are structured and arranged as a single top bar hood structural member with each of said exactly two mirror-imaged top bars;
        iii) a hood sweep angle defined as an included sweep angle between said top bar hood and said first portion of said exactly two drops; and
        iv) a drop angle defined as an included angle between said first portion of each of said exactly two drops and said second portion of each of said exactly two drops;
            (1) wherein said sweep angle is greater than said drop angle;
            (2) wherein said sweep angle is an acute angle;
    b) exactly two palm flat segments, each of said exactly two palm flat segments comprising:
        i) a straight length of said handlebar segment that is structured and arranged adjacent to a lowest handlebar segment;
        ii) wherein each said straight length of said handlebar segment is structured and arranged for a rider to grasp each said straight length of said handlebar segment; and
    c) exactly two thumb indices:
        i) wherein each of said exactly two thumb indices comprise a longer thumb index dimension and a shorter thumb index dimension, which together define a thumb index flat surface, and which define each of said exactly two thumb indices;
        ii) wherein said longer thumb index dimension that is structured and arranged parallel to a vertical handlebar segment when mounted on the bicycle stem;
        iii) wherein said shorter thumb index dimension length that is structured and arranged perpendicular to said vertical handlebar segment;
        iv) wherein each of said thumb index flat surface is angled at a mirrored angle relative to the bicycle stem; and
        v) wherein said mirrored angle of each said thumb index flat surface comprises approximately ninety degrees.

2. The coefficient ergonomic bicycle handlebar system of claim 1 wherein said coefficient ergonomic bicycle handlebar comprises nano tube zlyte resin with Graphene impregnated carbon fibers.

3. The coefficient ergonomic bicycle handlebar system of claim 1 wherein said hood sweep angle is less than 45 degrees.

4. The coefficient ergonomic bicycle handlebar system of claim 1 wherein said hood sweep angle is 12.5 degrees.

5. The coefficient ergonomic bicycle handlebar system of claim 1 wherein said drop angle is less than 30 degrees.

6. The coefficient ergonomic bicycle handlebar system of claim 3 wherein said drop angle is 26.5 degrees.

7. The coefficient ergonomic bicycle handlebar system of claim 1 wherein said longer thumb index dimension of said exactly two palm flat segments is greater than 100 mm.

8. The coefficient ergonomic bicycle handlebar system of claim 1 wherein said shorter thumb index dimension of said exactly two palm flat segments is greater than 20 mm.

9. The coefficient ergonomic bicycle handlebar system of claim 1 wherein combination of said hood sweep angle and said drop angle create a camera angle for viewing traffic behind a rider.

10. The coefficient ergonomic bicycle handlebar system of claim 1 wherein said combination of said hood sweep angle and said drop angle create a camera angle for viewing a road below and behind a rider.

11. The coefficient ergonomic bicycle handlebar system of claim 1 wherein said mirrored angle of each thumb index flat surface is ninety degrees.

12. The coefficient ergonomic bicycle handlebar system of claim 1 wherein said mirrored angle of each thumb index flat surface is 70 degrees.

13. The coefficient ergonomic bicycle handlebar system of claim 1 wherein said thumb index flat surface comprises an area less than 5 square cm.

14. The coefficient ergonomic bicycle handlebar system of claim 1 wherein each said exactly two palm flat segments provides a flat surface for rider gripping of said coefficient bar ergonomic bicycle handlebar.

15. The coefficient ergonomic bicycle handlebar system of claim 1 wherein each said exactly two palm flat segments provides a flat surface comprising a raised-surface texturing for rider gripping of said coefficient bar ergonomic bicycle handlebar.

16. The coefficient ergonomic bicycle handlebar system of claim 1 wherein said thumb index provides a gripping surface for gripping of said coefficient bar ergonomic bicycle handlebar.

17. The coefficient ergonomic bicycle handlebar system of claim 16 further comprising a kit including: said coefficient bar ergonomic bicycle handlebar and a set of installation instructions.

18. A method of using the coefficient ergonomic bicycle handlebar system of claim 16 comprising the steps of:
   a) obtaining a coefficient ergonomic bicycle handlebar;
   b) mounting said coefficient ergonomic bicycle handlebar; and
   c) gripping said coefficient ergonomic bicycle handlebar.

* * * * *